United States Patent [19]

Braukmann

[11] 4,176,786

[45] Dec. 4, 1979

[54] CONCEALED THERMOSTATIC CONTROL VALVE

[75] Inventor: Heinz W. Braukmann, Willowdale, Canada

[73] Assignee: Braukmann Armaturen AG, Rothrist, Switzerland

[21] Appl. No.: 850,691

[22] Filed: Nov. 11, 1977

Related U.S. Application Data

[63] Continuation-in-part of Ser. No. 777,115, Mar. 14, 1977.

[30] Foreign Application Priority Data

Nov. 25, 1976 [CA] Canada .................................. 266589

[51] Int. Cl.² .......................................... G05D 23/12
[52] U.S. Cl. ..................................... 236/99 K; 236/42; 85/45; 73/362.6; 73/368.2
[58] Field of Search .................. 236/42, 99 K, 100; 73/362.4, 362.6, 368.2; 85/45; 285/82, 89

[56] References Cited

U.S. PATENT DOCUMENTS

| | | | |
|---|---|---|---|
| 1,298,398 | 3/1919 | Purple | 85/45 X |
| 1,875,851 | 9/1932 | Carson | 236/42 |
| 1,884,794 | 10/1932 | McKee | 236/99 K |
| 2,419,820 | 4/1947 | Chandler | 236/42 X |
| 2,439,336 | 4/1947 | Dillman | 236/100 X |
| 2,628,781 | 2/1953 | Cantalupo | 73/368.2 X |
| 2,781,784 | 2/1957 | Baker | 73/368.2 X |
| 3,300,136 | 1/1967 | Züblin | 236/99 K |
| 3,319,467 | 5/1967 | Feinberg | 236/100 X |
| 3,438,574 | 4/1969 | Killias | 236/100 X |
| 3,821,975 | 7/1974 | Haker | 85/45 |
| 3,927,830 | 12/1975 | Briski | 62/225 |
| 4,030,798 | 6/1977 | Paoli | 285/89 X |
| 4,089,461 | 5/1978 | Gocke | 236/42 |

*Primary Examiner*—William H. Schultz

[57] ABSTRACT

A thermostatic control valve for regulating the supply of fluid through a conduit includes in combination a valve plate and seat in the conduit, the valve plate having a valve stem extending outwards of the conduit with the valve stem having a spring exterior of the conduit to move the plate away from the seat and a housing secured to the conduit with a retractable plunger in the housing operative on the valve stem. The plunger is contained in a casing having means responsive to temperature change to move the plunger towards the seat. An interior member is threaded in the housing and removable means are used for attachment to the interior member to rotate it in the housing, thus providing adjustment. The control valve is secured to the conduit through a washer having a pawl which engages with ratchet shaped teeth of a ring secured in the control valve.

10 Claims, 5 Drawing Figures

CONCEALED THERMOSTATIC CONTROL VALVE

This is a continuation in part of my application Ser. No. 777,115 filed on Mar. 14, 1977.

FIELD OF THE INVENTION

This invention relates to thermostatically controlled valves for use in locations where it is desirable to provide means for preventing unauthorized adjustment of the valves. More particularly, the invention relates to thermostatically controlled radiator valves which may not be adjusted without the use of a special key.

PRIOR ART

In recent years it has become common practice to install thermostatic control valves on radiators to provide zone control of the temperature. These valves have a rotatable control head with a numbered setting. The control head is adjusted manually and the numbered setting indicates the degree of change which has been effected over the pre-set position in which the valve is supplied.

Such installations are particularly popular in public buildings and large apartment blocks but a problem arises because unauthorized persons frequently rotate the control heads without cause, thus affecting the efficiency of the system. While valves, which may not be unlocked or adjusted without the use of a special key, have been devised for use in controlling the flow of fluids, thermostatically controlled radiator valves having the same feature are unknown.

SUMMARY OF THE INVENTION

The valve of this invention has a non-rotatable body which incorporates a mechanical temperature sensing element, the operation of which may be adjusted by pressure exerted thereon through a member threaded onto the interior of the valve body, which member can only be rotated by using a removable key. In particular, the mechanical sensing element has a plunger which moves due to change of temperature, the plunger being carried in a casing on which the threaded member exerts the variable pressure.

BRIEF DESCRIPTION OF THE DRAWINGS

The invention will now be described in relation to the accompanying drawings in which.

DESCRIPTION OF A PREFERRED EMBODIMENT

Figure 1:
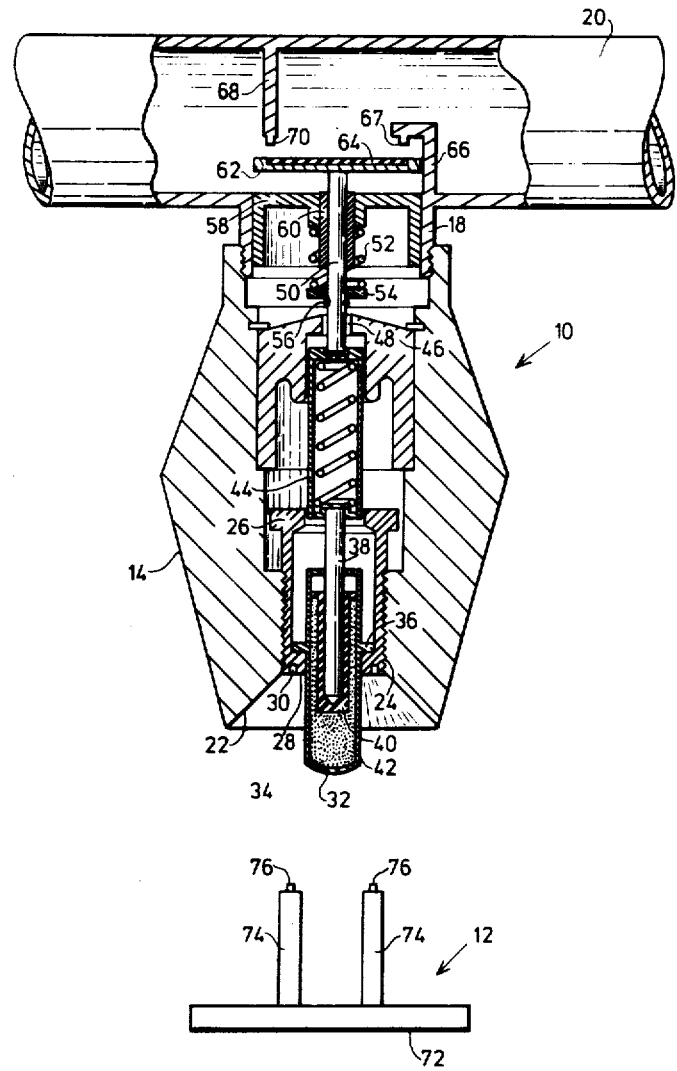
FIG. 1 is a cross sectional view taken through the valve connected through a spigot to a conduit, and associated removable key.

Referring now to the drawing, the embodiment of the invention shown herein for illustrative purposes comprises a valve, generally denoted by the numeral 10 and a removable key 12, adapted to adjust the control exercised by the valve 10.

More particularly, the valve 10 comprises an open ended housing 14, with threads 16 at one end adapted for fixed securement of the housing 14 to the threaded spigot 18 of the conduit 20 which contains the liquid flow into a radiator, not shown.

The other end of the housing 14 has a converging wall 22 which merges into an inwardly extending parallel threaded portion 24. A hollow threaded member 26 engages the threaded portion 24 and is wholly contained in the housing 14. The outermost face 28 of the threaded interior member 26 has spaced apart slots 30.

Traversing the flanged face 28 is the casing 32 of a thermostatic sensor generally denoted by the numeral 34. The casing 32 has a flange 36 which bears against the inner surface of the flanged face 28 of the threaded member 26. The thermostatic sensor 24 has a movable plunger 38 which projects from the casing 32 into the housing 14. The plunger 38 is supported in the casing 32 by a surrounding rubber casing 40 which in turn is enveloped by wax 42 contained by the wall of the casing 32. The thermostatic sensor 34 is mechanically sensitive to ambient temperature changes because the movement of the wax 42 expanding or contracting with change in temperature, projects or retracts the plunger 38 from the casing 32.

The free end of the plunger engages the recessed one end of a spring loaded relief cylinder 44 located in the housing 14. For the purposes of assembly of the valve, the relief cylinder 44 is aligned by an inwardly extending abutment 46 provided in the housing 14 which abutment has a channel 48.

The other end of the relief cylinder 44 is also recessed to bearingly locate the free end of a valve stem 50 which is surrounded by a compression spring 52, one end of which bears against a flange 54 on the valve stem 50 which flange 54 is held in place by a spring clip 56. The other end of the compression spring 52 bears against the wall 58 of the conduit 20. The wall 58 is traversed by a bearing sleeve 60 secured thereto; the valve stem 50 is slidably engaged in the bearing sleeve 60.

The valve stem 50 terminates in a valve plate 62 located in the conduit 20. The upper surface of the valve plate 62 is recessed to carry a rubber seal 64. The conduit 20 has an upwardly extending arcuate half wall 66, upstream of the valve plate 62, which has a seal 67 to engage the valve plate 62. Downstream of the valve stem 50 the conduit 20 has a downwardly extending half wall 68 which terminates in a seal 70 adapted to engage the rubber seal 64 of the valve plate 62 on movement of the latter towards the seal 70.

The operation of the valve will be clear in that with rise in ambient temperature the plunger 38 acting through the relief cylinder 44 on the spring loaded valve stem 50 moves the valve plate 62 towards the seal 70 thus reducing the flow of liquid to the radiator. When the ambient temperature drops the plunger 38 will retract and the compression spring 52 will cause the valve plate 62 to move away from the seal 70 thus increasing the flow of liquid.

The removable key is shown to have a cross arm 72 with normally spaced apart extending arms 74 each terminating in a prong 76 which is dimensioned to enter one of the slots 30 located in the outermost face of the threaded member 26. When the key 12 is engaged with the threaded member 26 the latter may be rotated thus increasing or decreasing the effect of movement of the plunger 38 due to change in temperature. Thus the setting of the sensor can be adjusted to change it from the factory setting and in response to the zone conditions. The flanged face 28 of the threaded member is located in the housing 14 in order that it may be inconspicuous.

The casing 32 of the thermostatic sensor 34 may be located entirely inside the housing 14; for instance, the threaded member 26 could be arranged to act on the flange 36 of the casing 34 through a surrounding spring.

The relief cylinder serves the purpose of alleviating the pressure exerted by the valve plate on the seal in the closure position.

The control valve described above may be secured in a locking manner to the spigot extending from the conduit, thus further discouraging tampering with or removal of the control valve. This is achieved by introducing at the junction of the control valve and the conduit spigot a supported circular washer having an outwardly extending pawl which engages with inwardly disposed ratchet shaped teeth of a surrounding ring positioned in the control valve.

Figure 2:
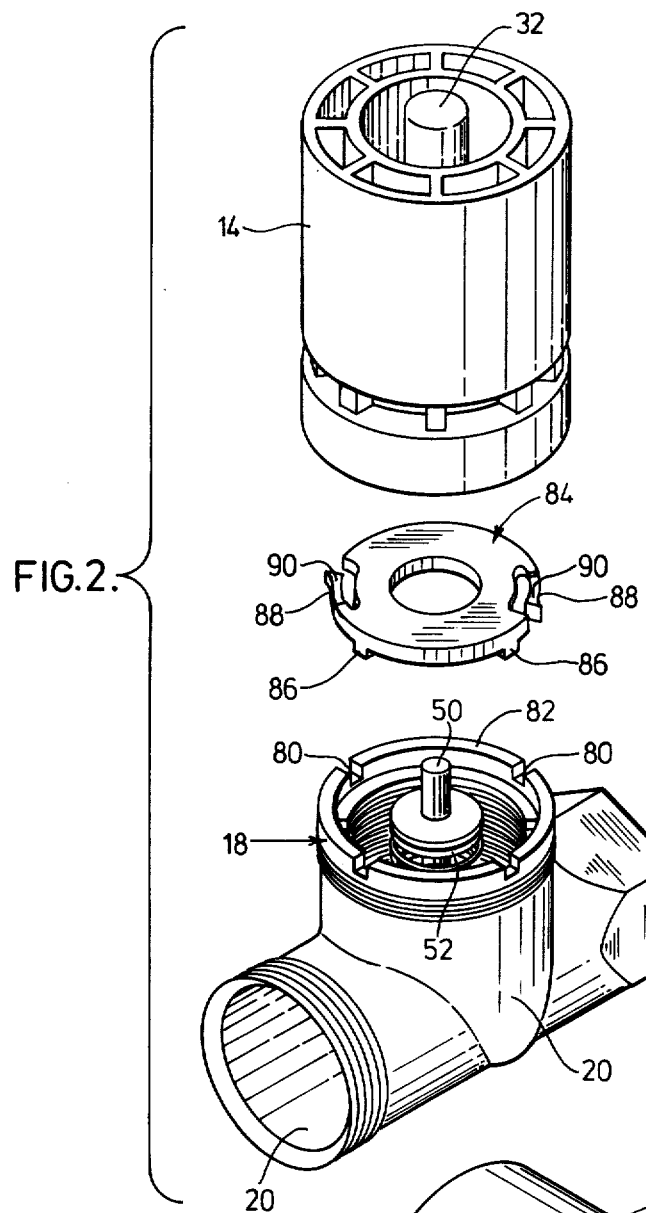
FIG. 2 is an exploded view of the spigot, control valve and annular washer before assembly.

The spigot 18 is provided with two pairs of diametrically opposed recesses 80 located in the free edge 82, as illustrated in FIG. 2. An annular washer, generally denoted by the numeral 84 and adapted to surround the valve stem 50 in spaced relationship, has ridges 86 on one surface so that each fits into an individual recess 80, thereby locating the position of the annular washer 84 on the spigot 18. The annular washer 84 has diametrically opposed extending pawls 88; preferably the annular washer 84 is made of plastic to provide the requisite degree of pivoting to the pawls 88 which are integral with the annular washer 84. The pawls are recessed at 90 to make them slightly thinner than the body of the annular washer 84.

Figure 3:
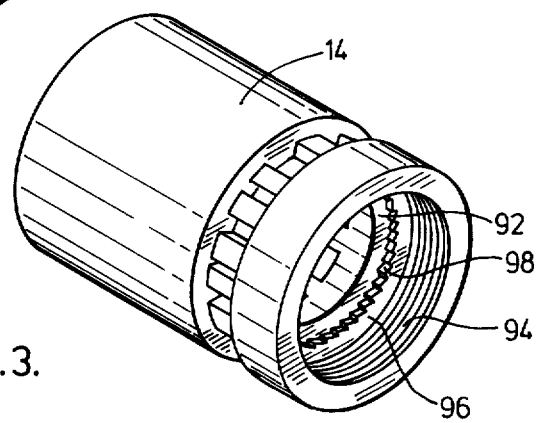
FIG. 3 shows the location of the surrounding ratchet toothed ring in the control valve.
Figure 4:
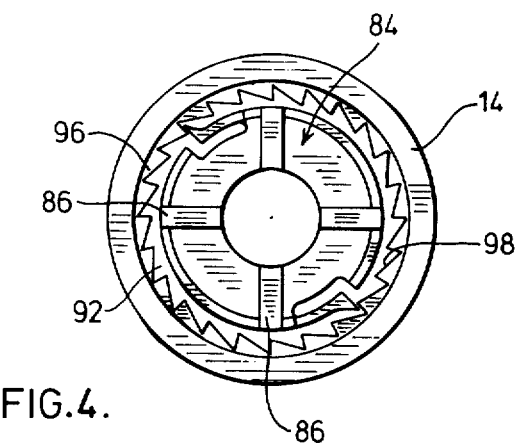
FIG. 4 is a plan view showing the pawls of annular washer in engagement with the ratchet teeth of the ring.
Figure 5:
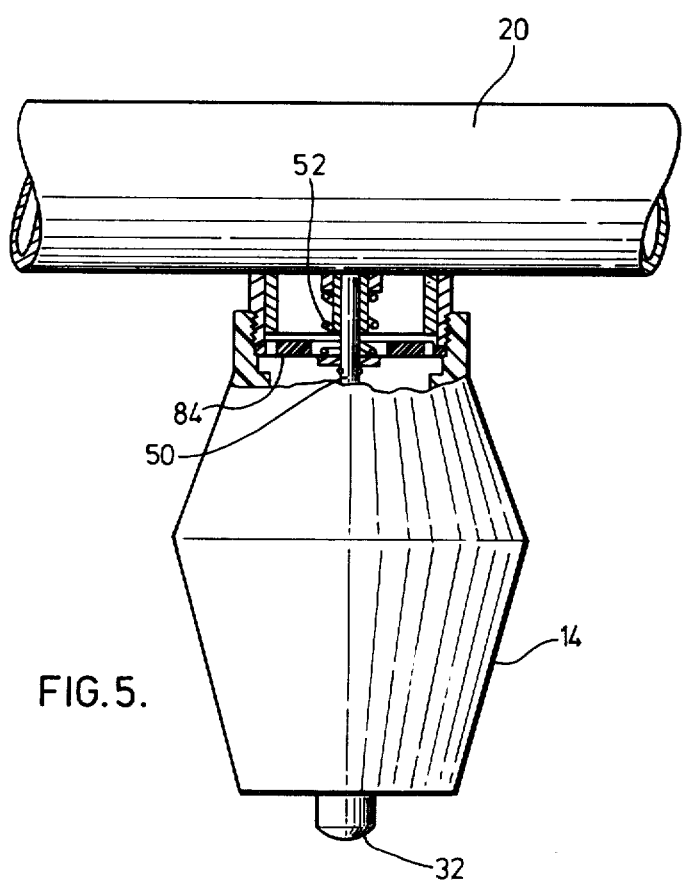
FIG. 5 is a view partly in section showing the location of the engaged annular washer and ring in the connection of the spigot and control valve.

The housing 14 has an inwardly extending shoulder 92 immediately below the threads 94 as illustrated in FIG. 3. The shoulder 92 supports a ring 96, which has inner teeth 98, each having one edge inclined to provide a ratchet for engagement with the pawls 98. The shoulder 92 has an inside diameter less than the outside diameter of the annular washer 84.

To assemble the parts, the annular washer 84 is placed on the spigot 18 with the ridges 86 each located in an individual recess 80. The ring 96 is placed on the shoulder 92 after which the housing 14 is threaded on to the spigot 18, then the pawls 88 engage with the teeth 98. Further rotation of the housing 14 with respect to the spigot will cause the pawls 88 to advance along the inclined surfaces of teeth 98 until the annular washer 84 engages the shoulder 92. The requisite tightening is then effected but in this process the pawls 88, being thinner than the annular washer 84, and hence removed from the shoulder 92, can still function in the requisite pivoted manner for advnacement along the teeth 98. When assembly is complete the engagement of the pawls 88 with the ratchet teeth 98 enables locking securement of the control valve to the spigot. It will be appreciated that the annular washer 84 may only have one pawl 88.

I claim:

1. A thermostatic control valve for regulating the supply of fluid through a conduit including in combination a valve plate and seal in said conduit, said valve plate having a valve stem extending outwards of said conduit, said valve stem having spring means exterior of said conduit to move said valve stem and plate away from said seal, a housing secured to said conduit, a retractable plunger in said housing operative on said valve stem, a casing for said plunger, means in said casing responsive to change in ambient temperature moving said plunger against said valve stem towards said seat, an interior member threaded in said housing, said interior member being wholly contained in said housing and having an outermost face adjacent an outer face of said housing, removable means engageable with said outermost face of said interior member to rotate same in said housing, said threaded interior member and casing being adapted for contact whereby rotation of said threaded interior member causes adjustment of the position of said plunger with respect to said seat.

2. A thermostatic control valve according to claim 1 wherein said interior member has a plurality of recesses facing outward of said housing and said removable member is a key having protuberances for location in said recesses.

3. A thermostatic control valve according to claim 1 wherein said means in said casing is wax surrounding a rubber casing containing said plunger, the expansion of said wax due to a rise in ambient temperature squeezing said rubber casing and extending said plunger from said casing.

4. A thermostatic control valve according to claim 1 wherein said threaded member and casing are in contact by co-operating shoulders.

5. A thermostatic control valve according to claim 1 wherein said conduit has a spigot, said housing and said spigot being adapted for threaded connection, an annular washer in said threaded connection, an outwardly extending pawl to said annular washer, a ring surrounding said washer, said ring having inner teeth forming a ratchet, said pawl being engageable with and moveable along said ratchet on tightening of said threaded connection and means in said connection for maintaining the engagement of said washer and said ring.

6. A thermostatic control valve according to claim 5 wherein said annular washer and said ring are made of plastic.

7. A thermostatic control valve according to claim 5 wherein said maintaining means is a shoulders in said housing to support said washer and said ring and said washer is removably secured to said spigot.

8. A thermostatic control valve according to claim 5 wherein said annular washer has a pair of diametrically opposed pawls engageable with said ratchet.

9. The thermostatic control valve according to claim 5 wherein said pawl is thinner than said annular washer.

10. A thermostatic control valve according to claim 7 wherein said washer has ridges on one face and said spigot has recesses adapted to engage said ridges in removable securement.

* * * * *